United States Patent
Morin

(10) Patent No.: US 11,506,281 B2
(45) Date of Patent: Nov. 22, 2022

(54) TORQUE CONVERTERS AND METHODS AND DEVICES FOR REBUILDING TORQUE CONVERTERS

(71) Applicant: Sonnax Transmission Company, Bellows Falls, VT (US)

(72) Inventor: Michael G. Morin, Keene, NH (US)

(73) Assignee: Sonnax Transmission Company, Bellows Falls, VT (US)

( * ) Notice: Subject to any disclaimer, the term of this patent is extended or adjusted under 35 U.S.C. 154(b) by 0 days.

(21) Appl. No.: 17/322,406

(22) Filed: May 17, 2021

(65) Prior Publication Data

US 2022/0010880 A1 Jan. 13, 2022

Related U.S. Application Data

(63) Continuation of application No. 16/665,558, filed on Oct. 28, 2019, now Pat. No. 11,009,125, which is a
(Continued)

(51) Int. Cl.
| | |
|---|---|
| *F16H 45/02* | (2006.01) |
| *F16H 41/24* | (2006.01) |
| *F16H 57/00* | (2012.01) |
| *F16H 61/14* | (2006.01) |
| *F16D 25/12* | (2006.01) |

(Continued)

(52) U.S. Cl.
CPC ......... *F16H 61/143* (2013.01); *F16D 25/126* (2013.01); *F16H 3/663* (2013.01); *F16H 45/02* (2013.01); *F16H 61/62* (2013.01); *F16H 63/3026* (2013.01); *F16D 13/58* (2013.01); *F16H 41/24* (2013.01); *F16H 55/0806* (2013.01); *F16H 2045/0294* (2013.01); *F16H 2057/0068* (2013.01); *F16H 2061/6609* (2013.01); *Y10T 29/49716* (2015.01)

(58) Field of Classification Search
CPC ........ F16H 61/143; F16H 61/62; F16H 3/663; F16H 63/3026; F16H 2045/0294; F16H 2061/6609; F16D 25/26; F16D 13/58
See application file for complete search history.

(56) References Cited

U.S. PATENT DOCUMENTS

| | | |
|---|---|---|
| 5,782,326 A | 7/1998 | Souza |
| 7,717,244 B2 | 5/2010 | Rowell |
| (Continued) | | |

OTHER PUBLICATIONS

URL: http://www.dieselpowerproducts.com/-14284-ats-3029503368-five-star-torque-converter-11-16-671-ford-powerstroke.aspx (Last viewed on Jan. 3, 2017).
(Continued)

*Primary Examiner* — Tinh Dang
(74) *Attorney, Agent, or Firm* — Levenfeld Pearlstein, LLC

(57) ABSTRACT

Methods of repairing a torque converter that enable the continued use of a torque converter and result in a repaired torque converter with a higher-strength and more durable construction. In some examples, a backing ring can be replaced with a replacement backing ring that includes a spline ring for replacing the function of a cover spline ring. In some examples, a method of repairing a torque converter can be improved by providing a replacement backing ring with a radial protrusion for locating the backing ring on the cover, and a method of determining an axial location of the radial protrusion.

9 Claims, 10 Drawing Sheets

Related U.S. Application Data continuation of application No. 15/860,954, filed on Jan. 3, 2018, now Pat. No. 10,458,540.

(60) Provisional application No. 62/441,714, filed on Jan. 3, 2017.

(51) Int. Cl.
| | |
|---|---|
| *F16H 3/66* | (2006.01) |
| *F16H 61/62* | (2006.01) |
| *F16H 63/30* | (2006.01) |
| F16H 61/66 | (2006.01) |
| F16D 13/58 | (2006.01) |
| F16H 55/08 | (2006.01) |

(56) References Cited

U.S. PATENT DOCUMENTS

| | | |
|---|---|---|
| 7,770,704 B1 | 8/2010 | Dumas |
| 2016/0238085 A1 | 8/2016 | Horen et al. |

OTHER PUBLICATIONS

URL: http://www.atsdiesel.com/ats2/product.asp?=3023368999&x=Ford_6.7-Powerstroke_Torque-Converters (Last viewed on Jan. 3, 2017).

TORQUE CONVERTERS AND METHODS AND DEVICES FOR REBUILDING TORQUE CONVERTERS

CROSS-REFERENCE TO RELATED APPLICATION DATA

This application is a continuation of U.S. patent application Ser. No. 16/665,558, filed Oct. 28, 2019, titled TORQUE CONVERTERS AND METHODS AND DEVICES FOR REBUILDING TORQUE CONVERTERS, which claims the benefit of and priority to U.S. patent application Ser. No. 15/860,954, filed Jan. 3, 2018, titled, TORQUE CONVERTERS AND METHODS AND DEVICES FOR REBUILDING TORQUE CONVERTERS, now U.S. Pat. No. 10,458,540, which claims the benefit of and priority to Provisional U.S. Patent Application Ser. No. 62/441,714, filed Jan. 3, 2017, titled, TORQUE CONVERTERS AND METHODS AND DEVICES FOR REBUILDING TORQUE CONVERTERS, the disclosures of which are incorporated herein in their entirety.

FIELD OF THE INVENTION

The present invention generally relates to the field of torque converters. In particular, the present invention is directed to torque converters and methods and devices for rebuilding torque converters.

BACKGROUND

When automobile automatic transmissions are repaired, the torque converter is usually disassembled, inspected and rebuilt. Generally, most of the key components are reusable. Worn and damaged parts are replaced as needed. Some original equipment (OE) torque converters are difficult to rebuild, often because the OE construction was optimized for high production rather than ease of repair. Specialized equipment is often required to repair OE torque converters, or rebuilders may simply refuse to repair certain models due to excess cost and complexity associated with repair versus replacement.

FIG. 1 is an exploded view of a portion of a prior art OE torque converter 100. The illustrated example is a torque converter from Ford's model number 6R140 transmission, which has been sold in large volumes for several years and is used in some relatively high cost diesel trucks. As described more below, prior art OE torque converter 100 has some common failure modes that are difficult to repair.

Torque converter 100 includes a cover 102 and lock-up clutch assembly 104; the lock-up clutch assembly including a piston 106 that is configured to engage a clutch pack 108 against a backing ring 110 to engage the lock-up clutch assembly. Clutch pack 108 includes two metal clutch plates 112, including front metal clutch plate 112F and rear metal clutch plate 112R, and a friction clutch plate 114 positioned therebetween. Metal clutch plates 112 each include a plurality of outer teeth 116 (only one labeled on each) that are sized and configured to slidably engage a spline ring 118 on an inner surface of cover 102. Friction clutch plate 114 has a plurality of inner teeth 119 (only one labeled) that are sized and configured to slidably engage a damper assembly (not illustrated) coupled to a transmission (also not illustrated). As is known in the art, torque converter 100 provides a fluid coupling between an engine output shaft and a vehicle transmission that transmits torque from the engine to the transmission while allowing for different rotational speeds of the engine and transmission. As is also known in the art, lock-up clutch assembly 104 can be engaged to mechanically lock the engine and transmission at the same rotational speed under certain conditions in order to improve efficiency. When lock-up clutch assembly 104 is not engaged, cover 102, piston 106, metal clutch plates 112, and backing ring 110 rotate with the engine output shaft, while friction clutch plate 114 rotates at a different speed with the transmission. When lock-up clutch assembly 104 is engaged, piston 106 forces clutch plates 112, 114 together and against backing ring 110, thereby engaging clutch pack 108 and forcing friction clutch plate 114 and the transmission to rotate at substantially the same speed as cover 102 and the vehicle engine output shaft.

FIG. 2 is a cross sectional view of a portion of OE torque converter 100 showing piston 106 in a fully retracted position, resulting in a clutch release clearance 202 between the piston and a front side 204 of metal clutch plate 112F. An inner surface 205 of cover 102 and piston 106 define a piston apply chamber 206 for receiving pressurized transmission fluid for applying the piston against clutch pack 108 and backing ring 110. OE torque converter 100 is sometimes referred to as a "three-pass" torque converter because it includes three fluid ports (not illustrated)—two ports (inlet and outlet) for the passage of transmission fluid into and out of a main torus volume 208 of the torque converter, and a third port (also not illustrated) for delivering pressurized fluid to piston apply chamber 206. A transmission incorporating OE torque converter 100 typically includes a dedicated apply control circuit for controlling the pressure in piston apply chamber 206 and applying and releasing piston 106, which can provide a more responsive lock-up clutch assembly 104 apply and release than torque converters that do not have a dedicated piston apply control circuit.

Backing ring 110 is welded at weld B1 to cover 102. When OE torque converter 100 is repaired, backing ring 110 is typically removed to inspect or replace clutch plates 112, 114. When backing ring 110 is reattached after repairs are complete, clutch release clearance 202 must be maintained to ensure proper clutch operation. In this example, clutch release clearance 202 should typically be between 0.010-0.040 inches. It is, however, difficult to properly reattach backing ring 110 because it is difficult to hold and weld backing ring 110 in place with acceptable accuracy. It is also challenging due to the relatively short engagement C1 of backing ring 110 to cover 102 and because torque converter rebuilders lack the special fixtures and equipment that were used by the original equipment manufacturer (OEM) during original manufacture. As a result of these challenges, many aftermarket torque converter rebuilders are reluctant or refuse to rebuild this type of torque converter.

FIGS. 3 and 4 are close-up views of a portion of clutch pack 108, cover 102, and spline ring 118 showing the loose fit between teeth 116 of OE metal clutch plates 112 and OE spline ring 118. Example OE spline ring 118 is rolled formed and is sometimes referred to in the art as a "Grob spline" because it is manufactured by a cold forming process by proprietary machines made by ERNST GROB AG. Spline ring 118 is pressed into and attached by welding to an inside surface 302 of cover 102. Spline ring 118 is an OE low-cost construction and is not precise in form, resulting in a loose fit with the mating teeth 116 of metal clutch plates 112, the loose fit identified as D1 in FIG. 3. The loose fit also results in a minimal engagement length, indicated by E1 in FIG. 3, resulting in minimal contact area between teeth 116 and corresponding recesses 304 defined by spline ring 118.

FIG. 4 shows a leaf spring 402, which is included in OE torque converter 100 in part to account for the loose fit described above between spline ring 118 and metal clutch plate teeth 116. FIG. 4 shows both metal clutch plates 112F, 112R and also shows inner teeth 119 of friction clutch plate 114 extending radially inward from an inner diameter 404 of metal clutch plates 112. Leaf spring 402 maintains a relative circumferential position of metal clutch plates 112F, R. Leaf spring 402 is attached to teeth 116 by pins 406 and thereby circumferentially separates the two clutch plates 112F, R and forces teeth 116 against radially-extending walls 408 of recesses 304 of spline ring 118. (As shown in FIG. 1, example torque converter 100 includes six leaf springs 402 spaced circumferentially around clutch pack 108). Leaf springs 402 can also aid in disengaging metal clutch plates 112 from friction clutch plate 114 when lock-up clutch assembly 104 is released. Leaf springs 402, however, are prone to early failure. When one or more of leaf springs 402 fail, the loose fit between spline 118 and metal clutch plate teeth 116 can result in spline backlash between spline ring 118 and metal clutch plates 112, causing vibration, rapid wear and noise when the clutch is not engaged and also causing damage to spline ring 118, which can result in the spline ring being worn beyond repair, which can leave no practical options to rebuild OE torque converter 100.

SUMMARY OF THE DISCLOSURE

In one implementation, the present disclosure is directed to a kit for repairing an original equipment ("OE") torque converter, the OE torque converter including a backing ring and a cover, the cover including a spline ring that engages an OE clutch plate of a lock-up clutch assembly. The kit includes a splined backing ring for replacing the OE backing ring, the splined backing ring includes an outer surface configured and dimensioned to be fixed to the cover; and a spline ring configured to engage a clutch plate of a modified lock-up clutch assembly.

In another implementation, the present disclosure is directed to a method of modifying an original equipment ("OE") torque converter, the OE torque converter including a cover, a backing ring welded to the cover, and a lock-up clutch assembly that includes a plurality of metal clutch plates, the cover including a spline ring that engages the plurality of metal clutch plates. The method includes cutting the cover to remove the backing ring; and installing a splined backing ring on the cover, the splined backing ring including a spline ring configured and dimensioned to engage a metal clutch plate of a modified lock-up clutch assembly.

In yet another implementation, the present disclosure is directed to a splined backing ring for replacing an original equipment ("OE") torque converter backing ring, the OE torque converter including a cover that includes a spline ring that engages an OE clutch plate of a lock-up clutch assembly. The splined backing ring includes an outer surface configured and dimensioned to be fixed to the cover of the OE torque converter; and a spline ring configured to engage a clutch plate of a modified lock-up clutch assembly.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Aspects of the present disclosure include methods of repairing a torque converter that enable the continued use of a torque converter and result in a repaired torque converter with a higher-strength and more durable construction. In some examples, a backing ring can be replaced with a replacement backing ring that includes a spline ring for replacing the function of a cover spline ring. In some examples, a method of repairing a torque converter can be improved by providing a replacement backing ring with a radial protrusion for locating the backing ring on the cover, and a method of determining a location of the radial protrusion.

The term "Original Equipment," "Original Equipment Manufacturer," and the corresponding abbreviations OE and OEM, and similar terms, as used herein, refer not only to torque converters and associated parts originally manufactured by a transmission manufacturer or originally sourced by a transmission manufacturer, but also refers to any aftermarket torque converters or torque converter parts conforming to the OE dimensions and specifications, for example, an aftermarket replacement parts.

Figure 4:
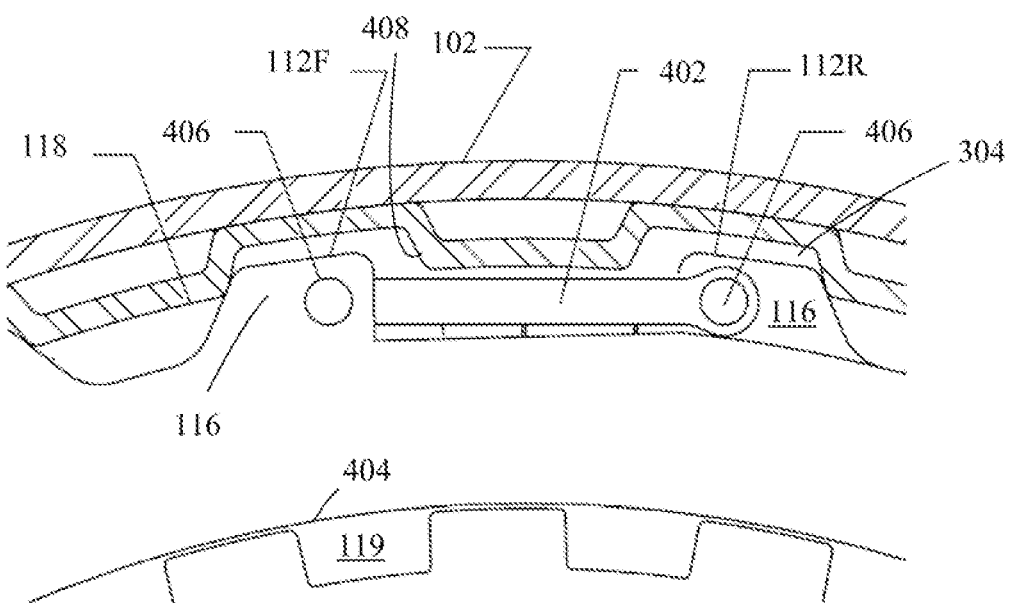
Figure 5:
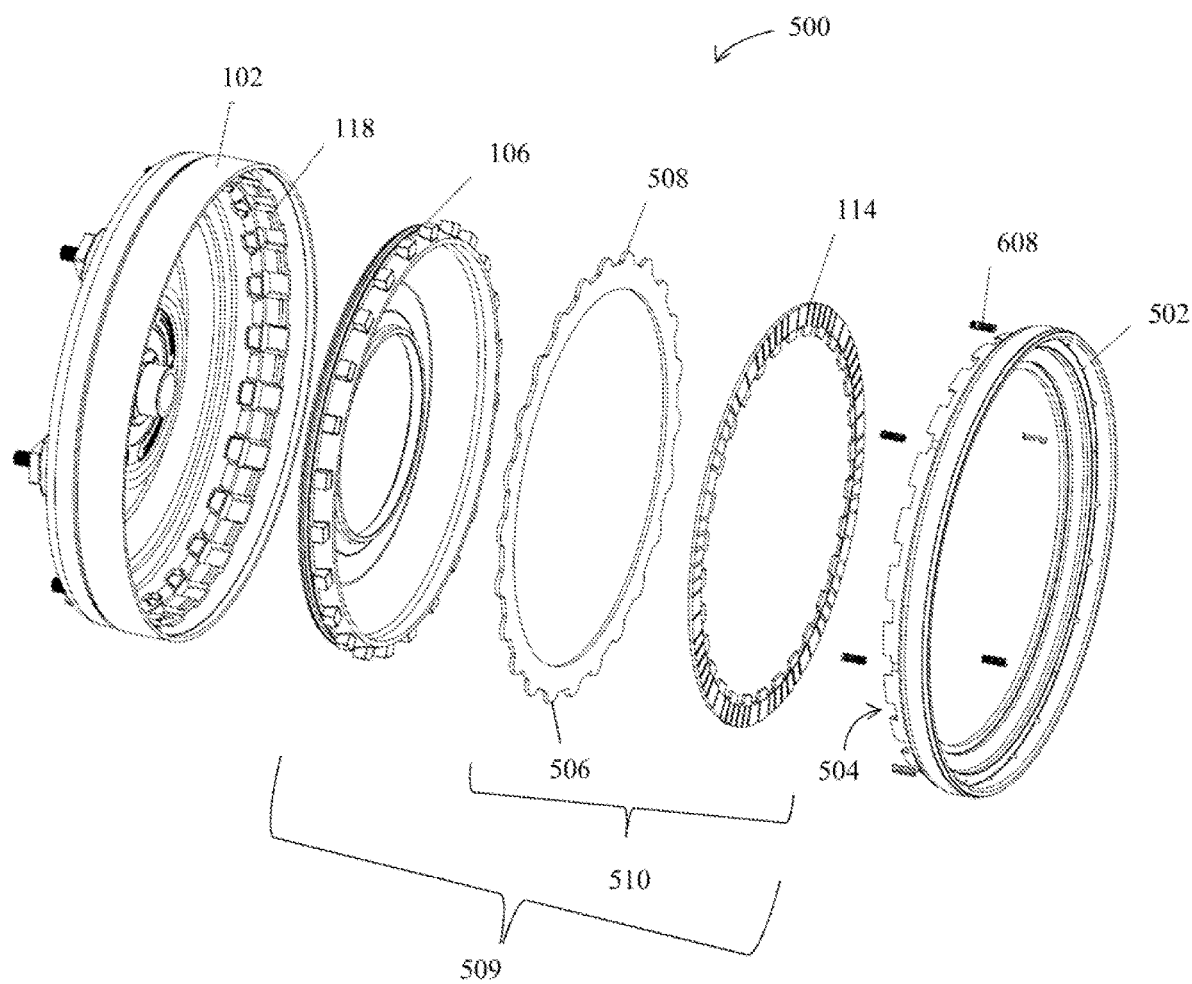
FIG. 5 is an exploded view of a portion of a rebuilt torque converter.

FIG. 5 is an exploded view of a portion of a rebuilt torque converter 500 which is a modified version of OE torque converter 100 (FIGS. 1-4). In the illustrated example, torque converter 500 includes OE cover 102, OE piston 106, and OE friction clutch plate 114. In other examples, OE friction clutch plate 114 can be replaced with an equivalent aftermarket friction clutch plate suitable for the application. Unlike OE torque converter 100, torque converter 500 includes a splined backing ring 502 that is designed and configured to replace OE backing ring 110 and also provide a spline ring 504 for engaging teeth 506 of a replacement metal clutch plate 508. In the illustrated example, it is, therefore, unnecessary to replace or repair OE spline ring 118, which can be a costly and labor-intensive process. In the illustrated example, rebuilt torque converter 500 includes a modified lock-up clutch assembly 509 that includes the OE cover 102, OE piston 106, replacement metal clutch plate 508, OE friction clutch plate 114, and splined backing ring 502.

Unlike OE torque converter 100, torque converter 500 includes a clutch pack 510 that only includes one metal clutch plate—replacement metal clutch plate 508—rather than two. Thus, unlike OE torque converter 100, torque converter 500 does not utilize OE spline ring 118 for engaging clutch pack 510 and instead utilizes spline ring 504 of splined backing ring 502. Use of splined backing ring 502 enables the repair of OE torque converter 100, even if OE spline ring 118 is damaged, for example due to failure of OE leaf springs 402 (FIG. 4) as described above. As described more below, a process for rebuilding OE torque converter 100 can include removing OE backing ring 110 (FIG. 1), replacing OE clutch pack 108 with replacement clutch pack 510, and attaching splined backing ring 502 to OE cover 102 resulting in a rebuilt torque converter with improved performance as compared to OE torque converter 100.

Figure 6:
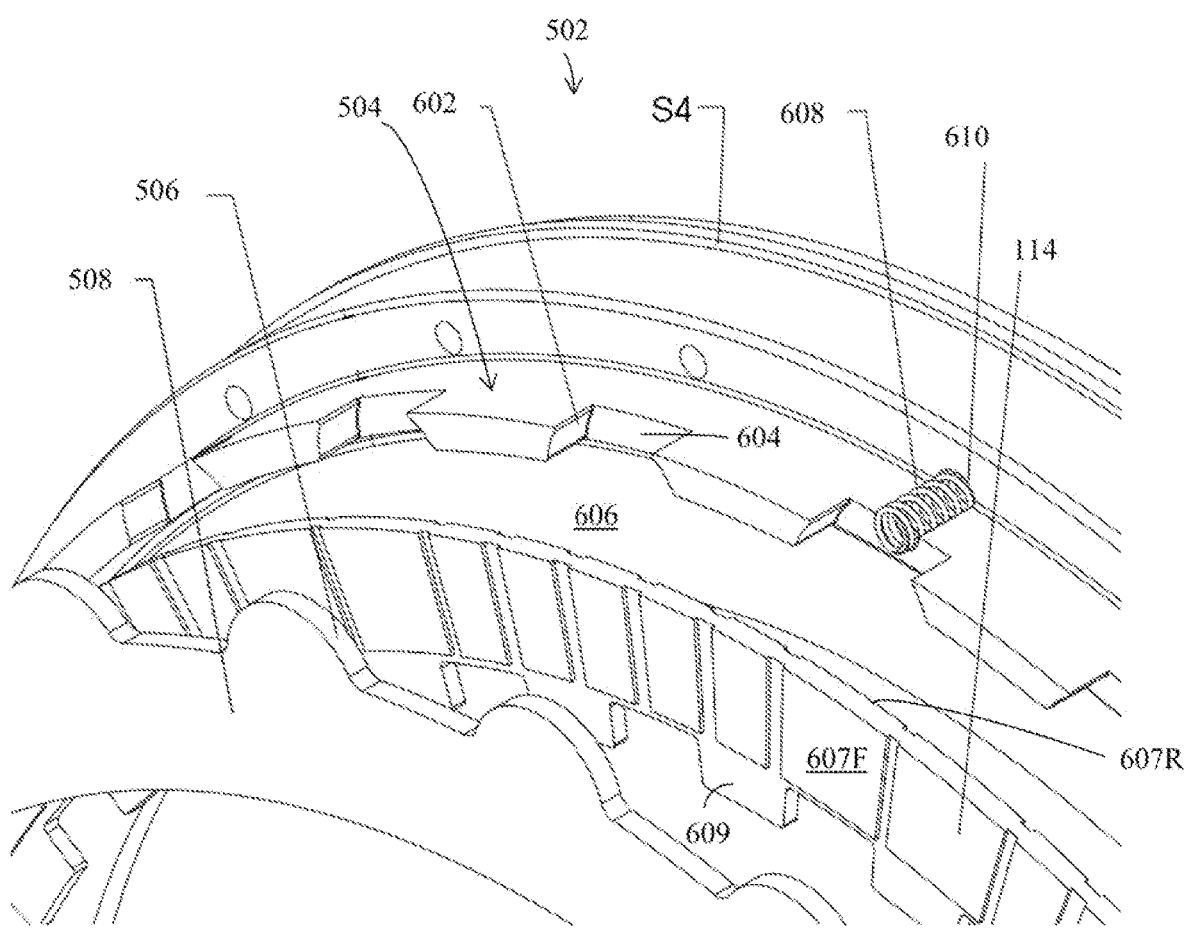
FIG. 6 is an exploded view of a portion of the torque converter of FIG. 5.

FIG. 6 is an exploded view of a portion of torque converter 500 showing splined backing ring 502 with spline ring 504 that includes a plurality of internal teeth 602 (only one labeled) defining recesses 604 therebetween that are configured and dimensioned to mate with outer teeth 506 of replacement metal clutch plate 508. For example, spline ring 504 is configured to engage replacement metal clutch plate 508, for example, in a splined manner, where teeth 602 enmesh with replacement metal clutch plate teeth 506. In the illustrated example, spline ring 504 is monolithically integrated with splined backing 502. In other examples, a separate spline ring may be fixed to another structure to form a splined backing ring. Splined backing ring 502 also includes a reaction surface 606 that is designed to replace the function of OE metal clutch plate 112R (FIG. 1) and provide a surface for engaging a friction surface 607R of OE friction clutch plate 114. In the illustrated example, friction clutch plate 114 includes a metal plate 609 that includes a plurality of friction surfaces 607 (only one labeled), including a plurality of front-side friction surfaces 607F on a front side of plate 609 and a plurality of rear-side friction surfaces 607R located on a rear-side of the plate. In other examples, rebuilt torque converter 500 may include a clutch pack with a two or more replacement metal clutch plates 508 and two or more friction clutch plates 114, with the rearward-most friction clutch plate configured to engage reaction surface 606. In yet other examples, a rebuilt torque converter made in accordance with the present disclosure may include a splined backing ring similar to splined backing ring 502, but without reaction surface 606, and replacement clutch pack 510 may include two replacement metal clutch plates 508. Torque converter 500 also includes a plurality of compression springs 608 (see also FIG. 5) to facilitate disengaging clutch pack 510 to prevent clutch drag when piston 106 is released. In the illustrated example, two or more springs 608 are located in blind holes 610 located in recesses 604 of spline ring 504 and are positioned to bear on teeth 506 of replacement metal clutch plate 508.

Spline ring 504 of splined backing ring 502 has a smaller outside diameter than an inside diameter of OE spline ring 118 such that it fits within the existing OE spline ring and replaces it. In the illustrated example, instead of replacement metal clutch plate teeth 506 mating with OE spline ring 118, the replacement clutch plate teeth mate with spline ring 504 of splined backing ring 502. Replacement metal clutch plate 508, therefore, has a smaller outside diameter than OE metal clutch plates 112 so that teeth 506 can mate with the smaller diameter spline ring 504.

Figure 7:
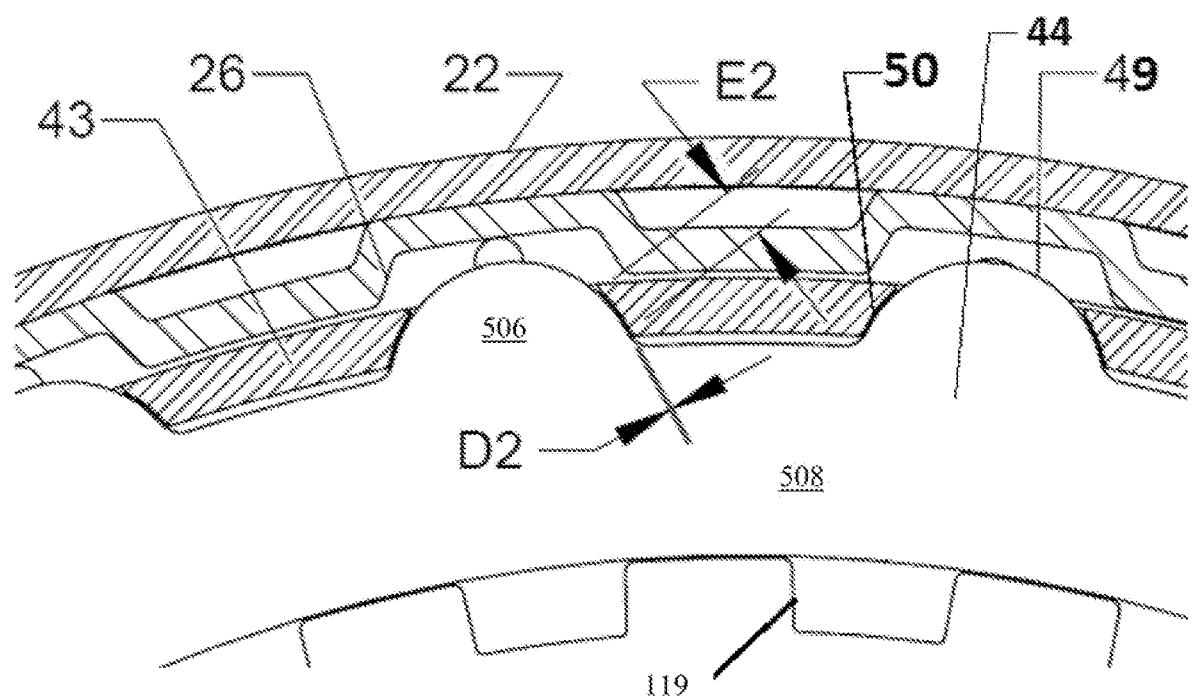
FIG. 7 is a close-up view of a portion of the torque converter of FIGS. 5 and 6.

Internal teeth 602 of splined backing ring 504 may be configured to mate with clutch plate teeth of any shape such as, for example, semicircular, involute or straight sided. In the illustrated example, the teeth 506 of replacement metal clutch plate 508 are semicircular. As shown in FIG. 7, by designing replacement metal clutch plate 508 and splined backing ring 502 as an integrated system, teeth 506 of clutch plate 508 and recesses 604 of spline ring 504 can have a much tighter fit than the poorly-matched OE clutch plate teeth 116 and spline ring 118, resulting in a reduced clearance fit D2 and an increased engagement length E2, where the engagement length E2 is increased relative to the OE engagement length E1 (FIG. 3) by up to approximately 100%, resulting in greater contact surface area and reduced spline surface wear. The single replacement metal clutch plate 508 and tighter fit between the clutch plate teeth 506 and spline ring 504 also eliminates the need for the failure prone OE leaf springs 402 (FIG. 4).

Figure 2:
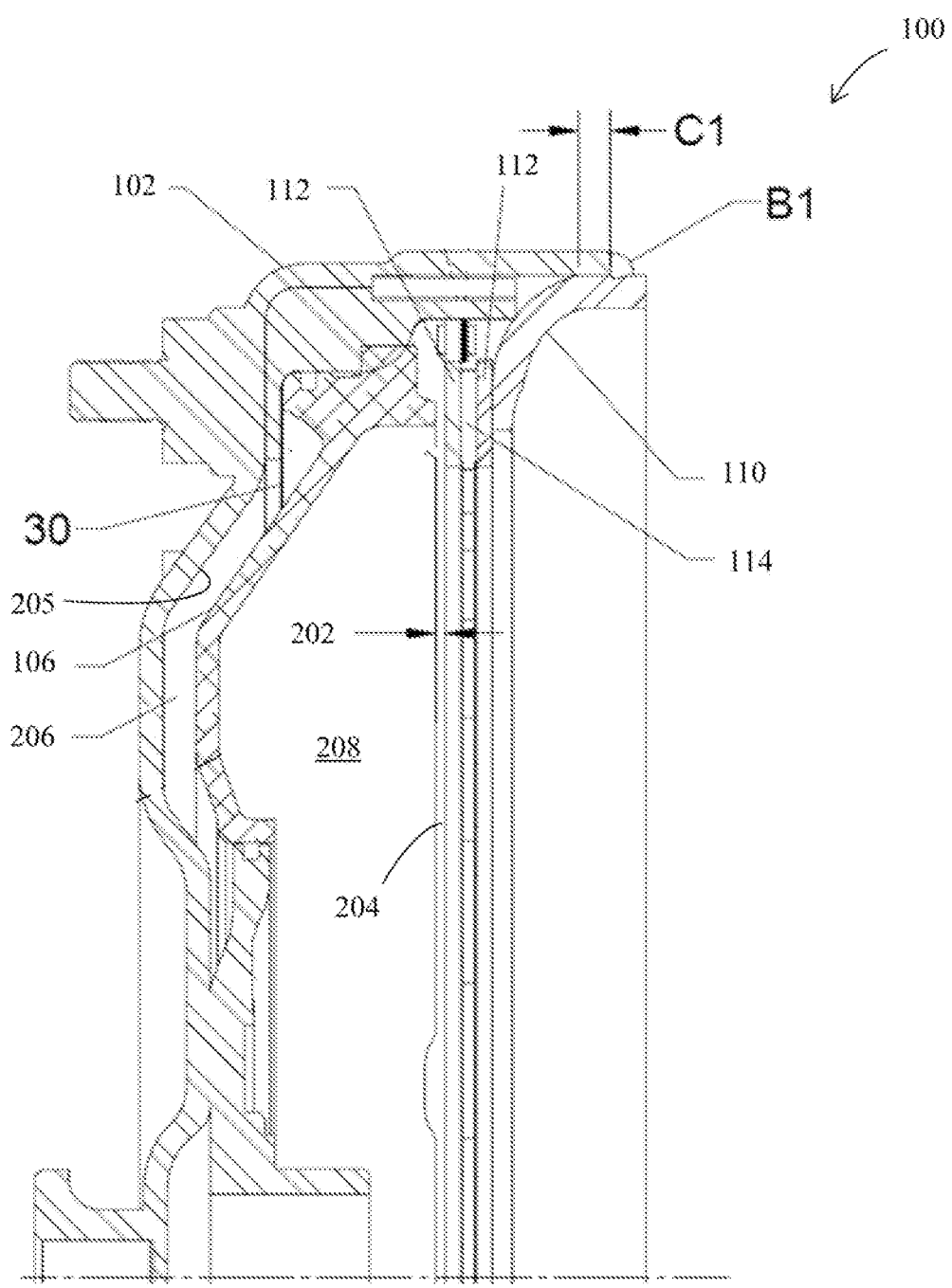
FIG. 2 is a cross sectional view of a portion of the prior art OE torque converter of FIG. 1.
Figure 3:
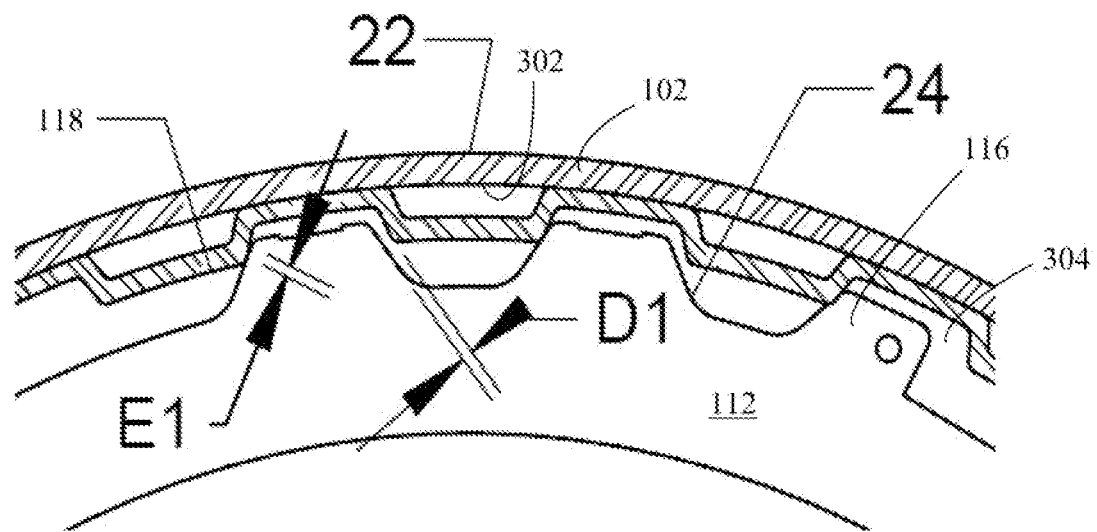
FIGS. 3 and 4, are close-up views of a portion of the prior art OE torque converter of FIGS. 1 and 2.
Figure 8:
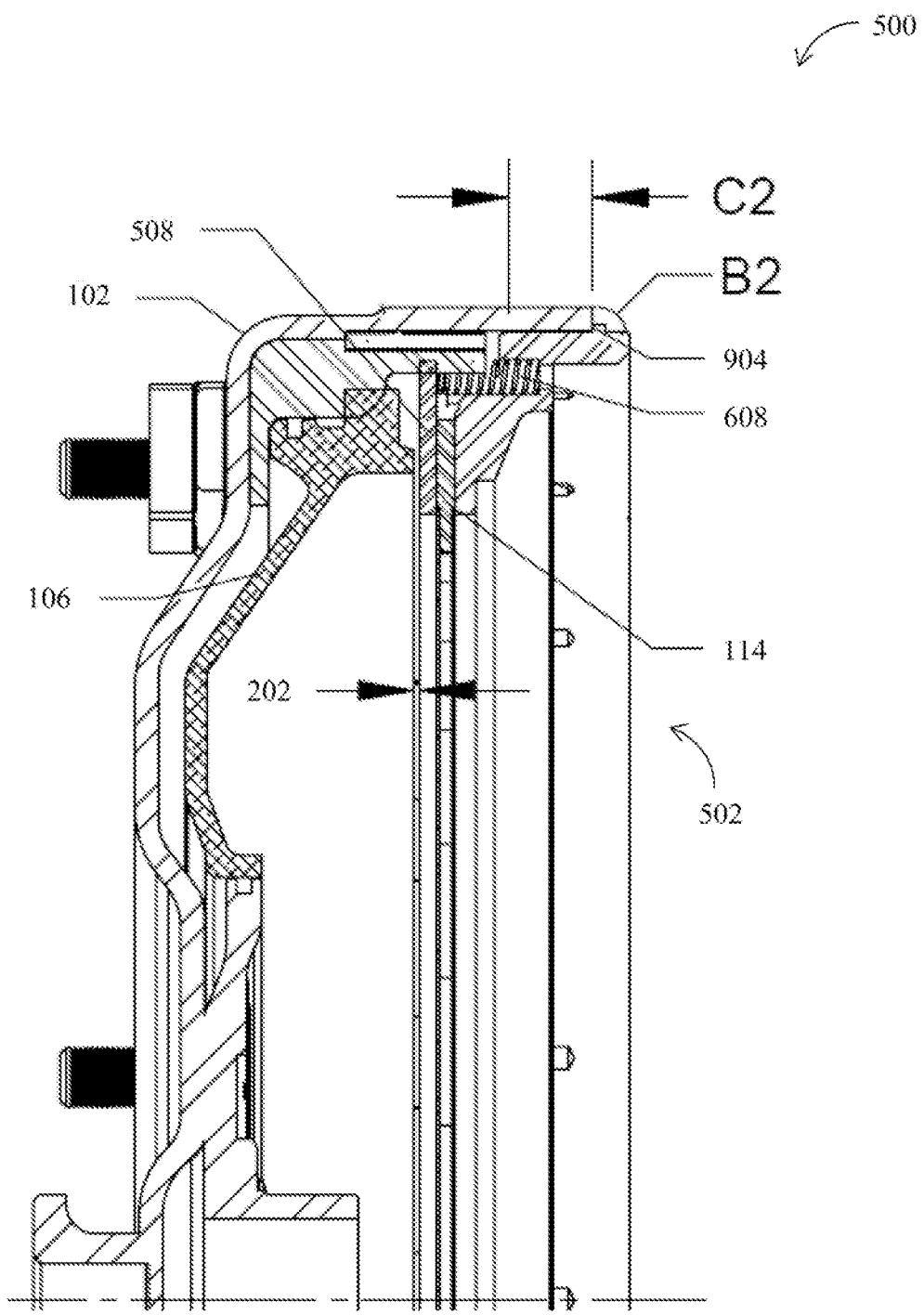
FIG. 8 is a cross-sectional view of the torque converter of FIGS. 5-7.

FIG. 8 is a cross-sectional view of rebuilt torque converter 500 in an assembled state. As shown in FIG. 8, when assembled, splined backing ring 502 has an axial engagement length C2 with cover 102 which is significantly greater than axial engagement length C1 between OE backing ring 110 and cover 102 (FIG. 2). In the illustrated example, C2 is 2.5 times greater than C1, meaning splined backing ring 502 is configured to fit 2.5 times deeper into OE cover 102 than OE backing ring 110. The increased depth C2 can facilitate setting the proper clutch release clearance 202 and welding (weld B2) splined backing ring 502 during the aftermarket rebuilding process.

Figure 9:
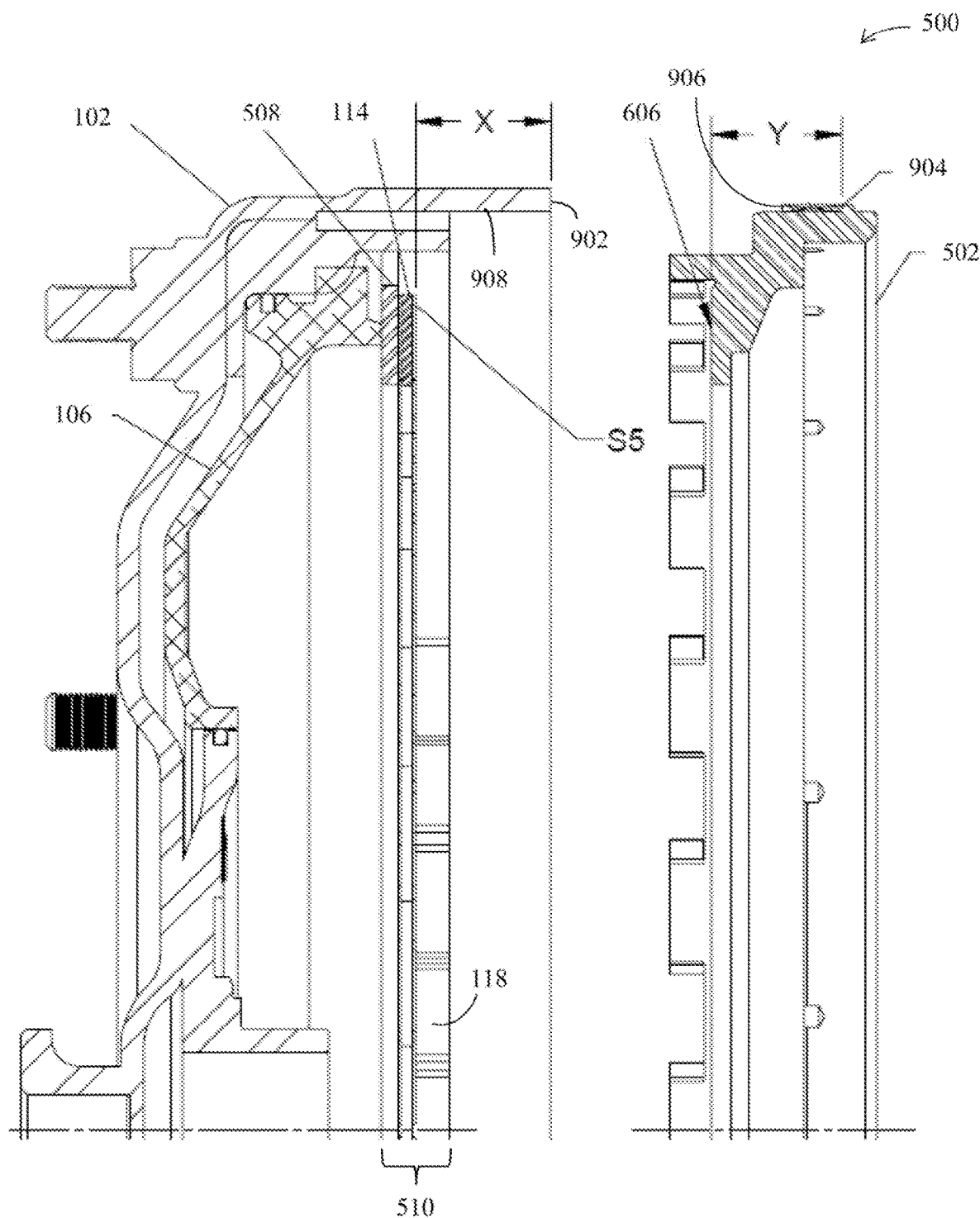
FIG. 9 is a cross-sectional view of the torque converter of FIGS. 5-8 showing the splined backing ring prior to installation.

FIG. 9 shows an exploded cross sectional view of a portion of rebuilt torque converter 500, showing piston 106 in a fully retracted position and showing replacement metal clutch plate 508 and friction clutch plate 114 resting against the piston. Distance X indicates the axial distance from a surface S5 of a rear surface of friction clutch plate 114 to a cut end 902 of cover 102. In the illustrated example, cover 102 was cut, e.g., lathe cut, at cut end 902 to remove OE backing ring 110. Splined backing ring 502 includes a step 904 on an outer surface 906, the outer wall sized to be positioned within cover 102 adjacent an inner wall 908 of the cover. Step 904 is located a distance Y from reaction surface 606 of splined backing ring 502, wherein the difference between distance Y and distance X is approximately equal to clutch release clearance 202 (e.g., Y minus X is approximately equal to clutch release clearance 202). Thus, step 904 can facilitate installation of splined backing ring 502 on cover 102 by precisely locating reaction surface 606 of the splined backing ring relative to clutch pack 510 and provide an appropriate clutch release clearance 202. In the illustrated example, step 904 is an annular step machined in outer surface 906. In other examples, step 904 may include a plurality of radial protrusions spaced circumferentially around outer surface 906.

Figure 1:
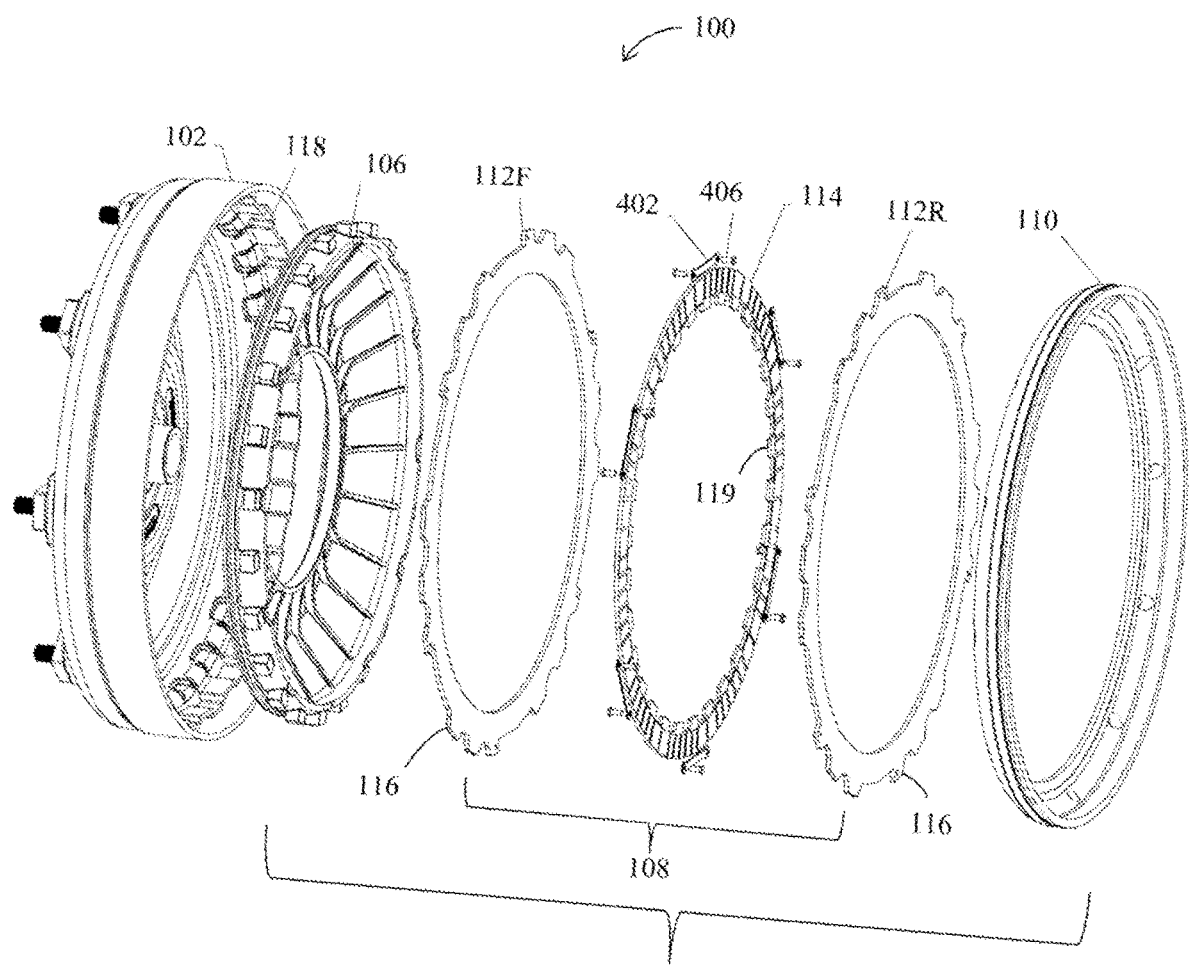
FIG. 1 is an exploded view of a portion of a prior art OE torque converter.
Figure 10:
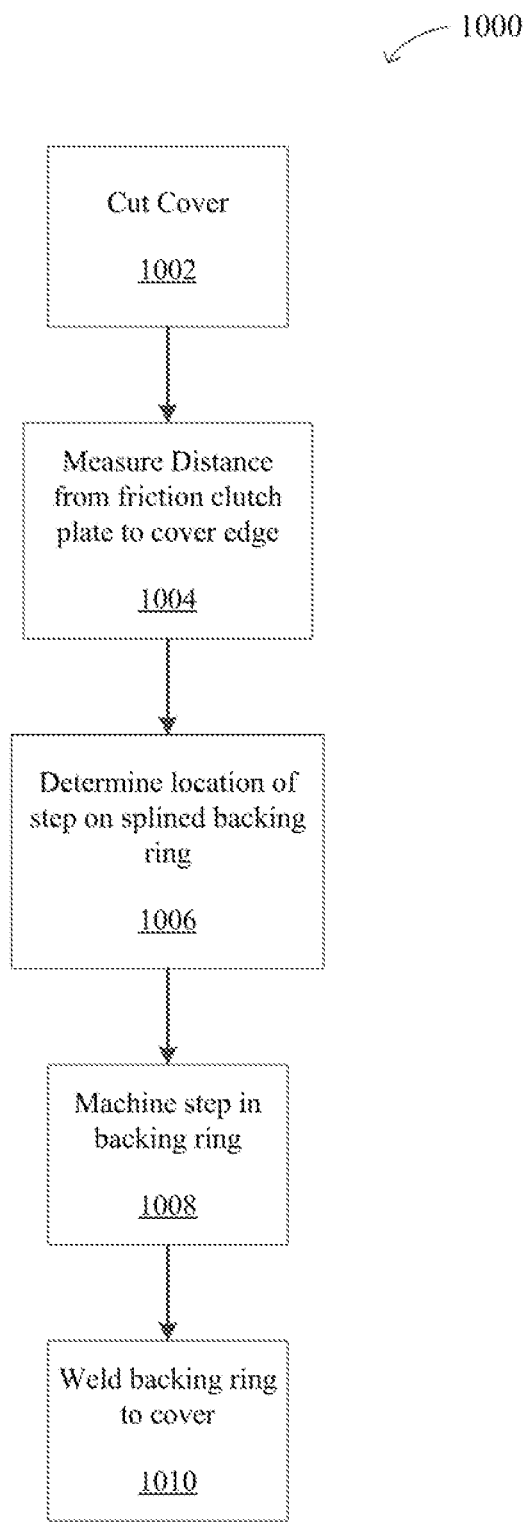
FIG. 10 is a flowchart of an example method for repairing a torque converter.

FIG. 10 is a flowchart of an example method 1000 for repairing a torque converter, such as OE torque converter 100 of FIG. 1. At step 1002 a cover of the torque converter, e.g., cover 102, can be cut, for example, by a torque converter rebuilder, to remove the backing ring, e.g., backing ring 110. The internal components of the torque converter can then be inspected and repaired or replaced as needed, for example, metal and friction clutch plates, such as OE metal and friction clutch plates 112, 114, can be replaced. For example, both of the OE metal clutch plates can be replaced with a single replacement metal clutch plate 508 and OE friction clutch plate 114 can be replaced with a new OE friction clutch plate 114. As discussed above, spline ring 118 of OE torque converter 100 are often damaged, sometimes beyond repair, making repair of the torque converter difficult. Instead of repairing OE spline ring 118, a replacement splined backing ring, such as splined backing ring 502 (FIG. 5), may be used.

At step 1004, an axial distance can be measured from the rearward-most clutch plate, when the clutch pack is positioned on the piston and the piston is fully retracted, to the cut edge of the cover. In the example illustrated in FIG. 9, the distance measured in step 1004 is illustrated as "X." In the illustrated example, the rearward-most clutch plate is friction clutch plate 114. In another example, where two metal clutch plates are used, the rearward-most clutch plate would be a metal clutch plate, such as a second replacement metal clutch plate 508. At step 1006, a location for a radially extending step (e.g., step 904) on splined backing ring 502 can be determined. In one example, the location may be determined by adding clutch release clearance 202 to the distance measured in step 1004 (distance X) resulting in distance Y (FIG. 9). Distance Y can then be measured from splined backing ring reaction surface 606 to a location on outer wall 906 of splined backing ring 502. For example, distance Y can be a linear distance from a plane reaction surface 606 is located in to a location on outer wall 906 where step 904 is to be located. At step 1008, step 904 can then be added, for example, machined into backing ring 502, and at step 1010, splined backing ring 502 can be inserted into cover 102 until step 904 rests against cut end 902 of cover, and then splined backing ring 502 can be welded to the cover. By utilizing step 904, an increased axial engagement length C2, no special fixtures are required for positioning splined backing ring 502 on cover 102 and welding the splined backing ring to the cover.

Figure 11:
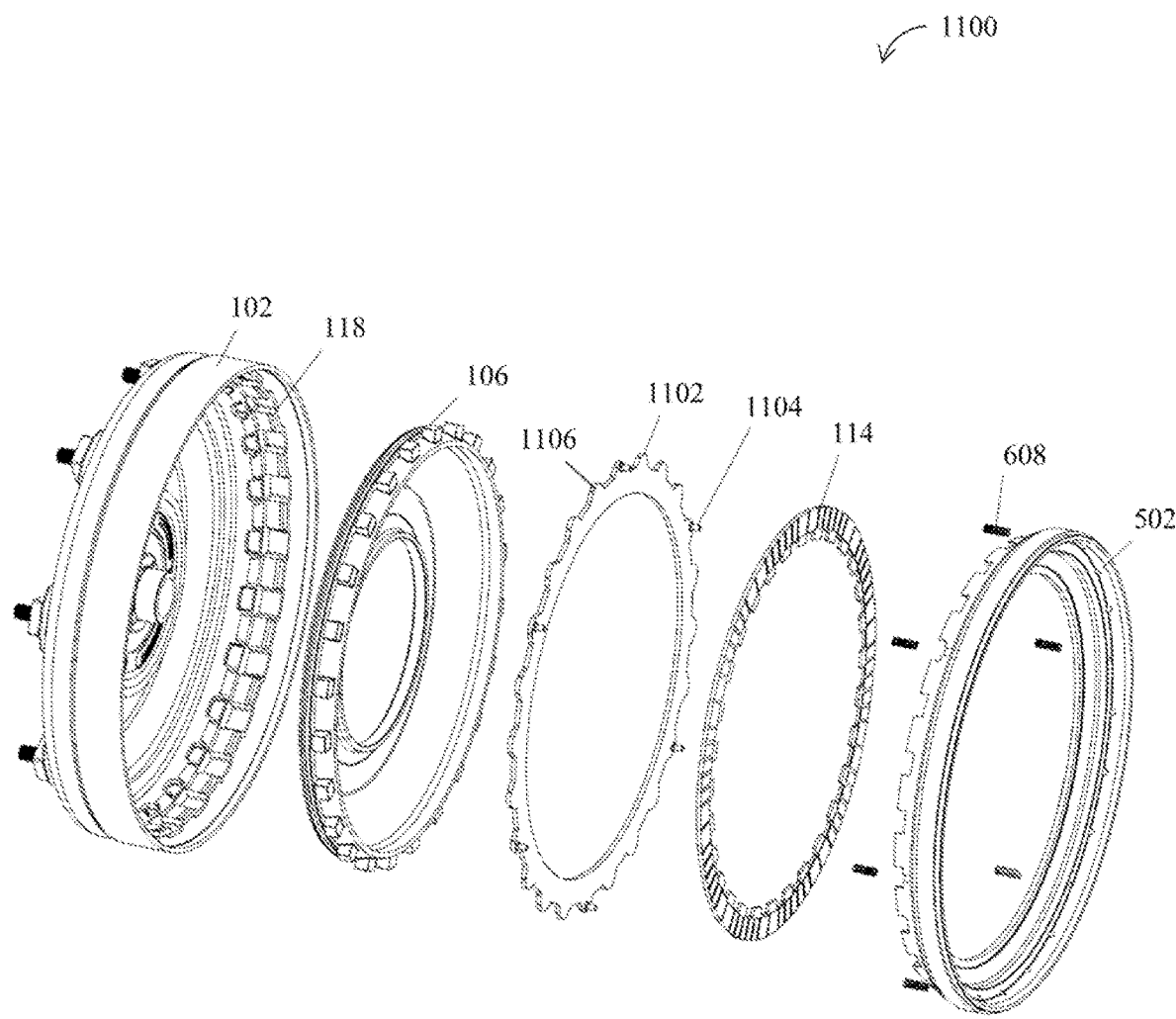
FIG. 11 is an exploded view of another example of a rebuilt torque converter.

FIG. 11 is an exploded view of another example of a rebuilt torque converter 1100 that is substantially the same as rebuilt torque converter 500 (FIG. 5), with identical parts having the same numbers. Unlike rebuilt torque converter 500, rebuilt torque converter 1100 includes a replacement metal clutch plate 1102 that differs from replacement metal clutch plate 508 (FIG. 5) in that it includes a plurality of spring guides 1104 located on teeth 1106. Spring guides 1104 (one labeled) are sized and located to be aligned with compression springs 608 and are configured to guide compression springs 608 (one labeled). For example, spring guides 1104 can prevent springs 608 from being pulled radially outward by centripetal forces during operation when the lock-up clutch is released. Spring guides may also include a hardened base (not illustrated) located between a forward end of each spring 608 and metal clutch plate teeth 1106 to prevent excessive wear of the clutch plate teeth by the springs.

In one example, a kit for rebuilding an OE torque converter, such as OE torque converter 100, may be provided that includes at least one metal clutch plate 508, at least one friction clutch plate 114, at least one splined backing plate 502 and a plurality, e.g., six compression springs 608. The kit may also include instructions for performing method 1000 (FIG. 10).

The foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of X and one or more of Z; one or more of Y and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A splined backing ring for a torque converter backing ring, the torque converter including a cover that includes a spline ring that engages a clutch plate of a lock-up clutch assembly, the splined backing ring comprising:
   an outer surface configured and dimensioned to be fixed to the cover of the torque converter;
   a spline ring configured to engage a clutch plate of a modified lock-up clutch assembly;
   a plurality of teeth extending transverse to a plane defined by the backing ring; and
   a reaction surface inwardly of the plurality of teeth,
   wherein the spline ring is configured to engage one and only one clutch plate of the lock-up clutch assembly.

2. The splined backing ring of claim 1, wherein the teeth are semicircular.

3. The splined backing ring of claim 1, wherein the teeth are involute.

4. The splined backing ring of claim 1, wherein the teeth are straight sided.

5. The splined backing ring of claim 1, wherein the teeth define recesses between adjacent teeth.

6. The splined backing ring of claim 1, wherein the spline ring is integral with the splined backing ring.

7. The splined backing ring of claim 1, wherein the reaction surface is configured for engaging a friction surface of a friction clutch plate of the modified lock-up clutch assembly.

8. The splined backing ring of claim 1, wherein the torque converter is a torque converter for Ford's model number 6R140 transmission.

9. The splined backing ring of claim 2, wherein the teeth are internal teeth, extending generally transverse to a plane defined by the backing ring.

* * * * *